(No Model.)
W. L. BLACK.
ANTIFRICTION CLASP.
No. 484,947. Patented Oct. 25, 1892.
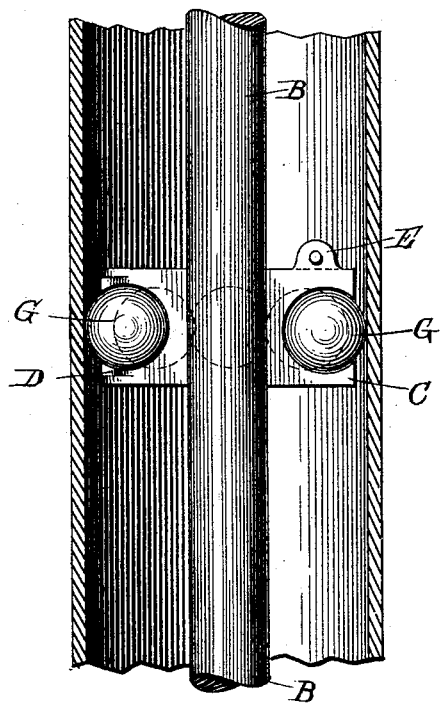
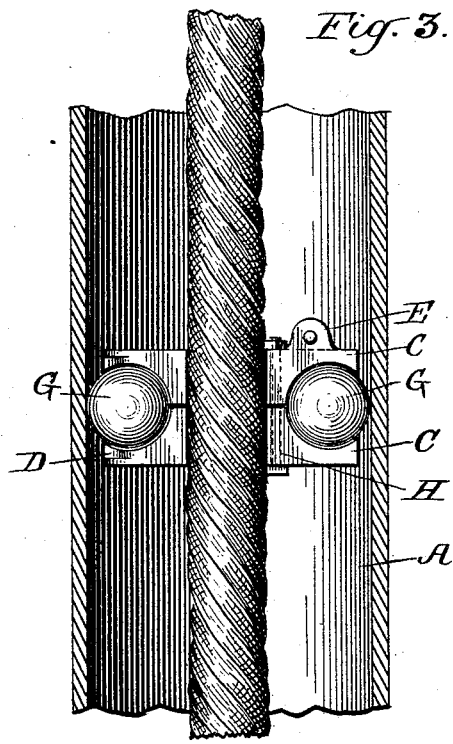
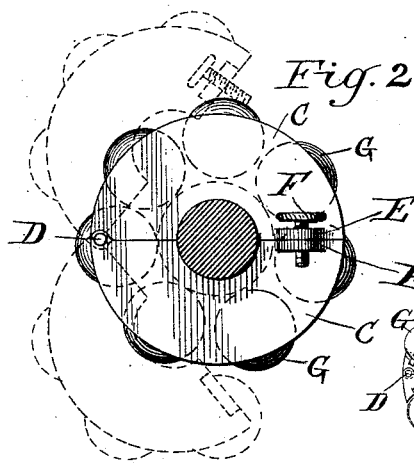
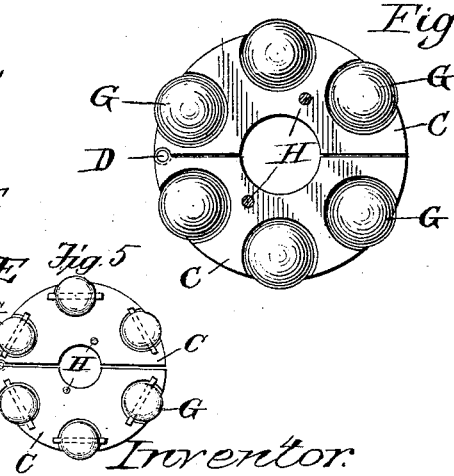
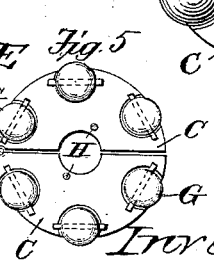
Witnesses:
A. M. Parkins
A. C. Rawlings
Inventor:
William L. Black,
by Lemiee & Goldsborough
Attys.

UNITED STATES PATENT OFFICE.

WILLIAM L. BLACK, OF FORT McKAVETT, TEXAS.

ANTIFRICTION-CLASP.

SPECIFICATION forming part of Letters Patent No. 484,947, dated October 25, 1892.

Application filed October 12, 1891. Renewed September 13, 1892. Serial No. 445,772. (No model.)

*To all whom it may concern:*

Be it known that I, WILLIAM L. BLACK, a citizen of the United States, residing at Fort McKavett, in the county of Menard and State of Texas, have invented certain new and useful Improvements in Antifriction-Clasps; and I do hereby declare the following to be a full, clear, and exact description of the invention, such as will enable others skilled in the art to which it appertains to make and use the same.

The object of my invention is to provide means whereby the wear due to the rubbing of inclosed rods or ropes against an inclosing casing may be reduced to a minimum and whereby the central alignment of the rods or ropes with respect to the inclosing casing may be accurately preserved.

My invention is more particularly adapted for use in connection with sucker-rods used in Artesian, oil, or other wells, especially wooden rods, as well as with ropes or chains used in drilling or boring wells, or for other purposes. I accomplish these objects in the manner and by the means hereinafter described, reference being had to the accompanying drawings, in which—

Figure 1 is a vertical sectional view of a portion of a well tube or casing and its sucker-rod embodying my improvement. Fig. 2 is a top plan view of my device, showing in dotted lines its open or disengaged position. Fig. 3 is a similar view to Fig. 1, showing the device applied to a rope, and also illustrating a modification in the construction. Fig. 4 is a top plan view of the lower section of the device shown in Fig. 3. Fig. 5 is a top plan view, on a smaller scale, showing the friction rollers or balls mounted on journals.

Referring to Figs. 1 and 2, the letter A designates the well tube or casing; B, a sucker-rod, and C my improved antifriction-clasp in place on the sucker-rod B. The said clasp is divided parallel with its axis into two semicircular sections, the sections being hinged together, as at D, and provided at a point diametrically opposite the hinge with lugs E, adapted to be fastened together by a screw-nut F, whereby the clasp, as shown in Fig. 5, may be clamped upon the sucker-rod or other object. Any other form of fastening may be used in place of the screw and lugs shown. In each of said sections and in the same central horizontal plane is an annular recess adapted to receive and retain the antifriction balls or rollers G and large enough to permit their free rotation. The said balls or rollers are inserted into said recess from the ends of the sections when the latter are in their open position, as shown in dotted lines, Fig. 2, and project somewhat beyond the sides of the clasp.

From the above description it will be seen that as the sucker-rod is moved up and down in the tube or casing the friction balls or rollers projecting from the sides of the clasp will impinge against the casing and receive the entire wear due to said contact, thereby preserving the rod for an indefinite period.

In Figs. 3 and 4 I have illustrated a modification of the device wherein I not only form the clasp into semicircular hinged sections, as above described, but also divide each section horizontally into halves connected together by the bolts H. In this construction of the clasp I form in each upper and lower section half-sockets for the reception of the friction balls or rollers, as shown, instead of forming the clasp with the annular recess. Instead of employing the friction-balls loosely inserted into the sockets, I may mount them on journals tangentially arranged with respect to the periphery of the clasp. It will be observed that the clasp when used in connection with a small inclosing casing—such as are used in Artesian or oil wells—will not only take up the wear, but also preserve the central alignment of the rod or rope with respect to the casing.

I do not wish to limit my invention to the particular uses hereinbefore mentioned, as the device is adapted to be employed with any tube, rod, or rope that is exposed to frictional contact in an inclosing casing.

Having thus described my invention, what I claim, and desire to secure, is—

1. An antifriction-clasp for inclosed traveling rods or ropes, said clasp having a series of friction balls or rollers mounted therein and projecting from the periphery thereof and being divided into sections adapted to be clamped at any point around the rod or rope, substantially as described.

2. An antifriction-clasp for inclosed traveling rods or ropes, said clasp having a series of friction balls or rollers mounted therein and projecting from its periphery and being divided into two sections hinged together at one side and having a fastening device at the other, whereby the clasp may be clamped at any point around the rod or rope, substantially as described.

3. An antifriction-clasp for inclosed traveling rods or ropes, formed in sections hinged together parallel with its axis and divided transversely into halves, the meeting faces of each section having half-sockets therein registering with those in the other section and forming spherical sockets, in combination with friction balls or rollers retained in said sockets and projecting from the sides of the clasp, substantially as described.

In testimony whereof I affix my signature in presence of two witnesses.

WILLIAM L. BLACK.

Witnesses:
FELIX PROBAVD, Sr.,
JNO. M. HAGELSTEIN.